United States Patent
Hickman et al.

(10) Patent No.: US 8,416,236 B1
(45) Date of Patent: Apr. 9, 2013

(54) CALIBRATION OF DEVICES USED TO GENERATE IMAGES OF A THREE-DIMENSIONAL OBJECT DATA MODEL

(75) Inventors: Ryan Hickman, Mountain View, CA (US); James R. Bruce, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/587,986

(22) Filed: Aug. 17, 2012

Related U.S. Application Data (60) Provisional application No. 61/673,648, filed on Jul. 19, 2012.

(51) Int. Cl.
*G06T 15/00* (2011.01)

(52) U.S. Cl.
USPC .......................................... 345/419

(58) Field of Classification Search ........................ None
See application file for complete search history.

(56) References Cited

U.S. PATENT DOCUMENTS

| | | | |
|---|---|---|---|
| 2002/0044691 A1* | 4/2002 | Matsugu | 382/218 |
| 2002/0150288 A1* | 10/2002 | Fujiwara | 382/154 |
| 2007/0253618 A1* | 11/2007 | Kim et al. | 382/154 |

OTHER PUBLICATIONS

Autodesk 123D Catch, Catch and carry, Turn ordinary photos into extraordinary 3D models, www.123dapp.com/catch, retrieved Jan. 2013.

\* cited by examiner

*Primary Examiner* — Xiao M. Wu
*Assistant Examiner* — Mohammad H Akhavannik
(74) *Attorney, Agent, or Firm* — McDonnell Boehnen Hulbert & Berghoff LLP (57) ABSTRACT

Examples are disclosed for calibrating devices used to generate images of a three-dimensional object data model ("3D model"). An initial 3D model that represents an object can be received. The initial 3D model can include a plurality of images aligned relative to one another. The plurality of images can be generated using a plurality of devices. A realignment of the plurality of images can be performed. An updated 3D model can be generated based on the realignment. At least one calibration of at least one of the plurality of devices can be determined based on a comparison of the initial 3D model with the updated 3D model. Calibration data can be provided to a computing device. The calibration data can be indicative of the at least one calibration. The computing device can be operable to use the calibration data to perform the at least one calibration.

19 Claims, 6 Drawing Sheets

CALIBRATION OF DEVICES USED TO GENERATE IMAGES OF A THREE-DIMENSIONAL OBJECT DATA MODEL

CROSS-REFERENCE TO RELATED APPLICATIONS

This application claims the benefit of U.S. Provisional Application No. 61/673,648, filed on Jul. 19, 2012, the entirety of which is incorporated herein by reference.

BACKGROUND

In computer graphics, three-dimensional (3D) modeling involves generation of a representation of a 3D surface of an object. The representation can be referred to as a 3D object data model, and can be rendered or displayed as a two-dimensional image by way of 3D rendering or displayed as a 3D image. A 3D object data model typically represents a 3D object using a collection of points in 3D space, connected by various geometric entities such as, for example, triangles, lines, and curved surfaces. Various techniques exist for generating 3D object data models utilizing, for example, point clouds and geometric shapes.

Being a collection of data, a 3D model can be created by hand, algorithmically, or by scanning one or more objects. As an example, an artist can manually generate a 3D image of an object; the 3D image can be used as the 3D model. As another example, an object can be scanned from different angles to generate scanned images. The scanned images can be combined to generate the 3D image of the object. As yet another example, an image of an object can be used to generate a point cloud that can be algorithmically processed to generate the 3D image.

A 3D object data model can include a solid model that defines a volume of the object, or can include a shell or boundary model that represents a surface, such as, for example, the boundary of the object. Because the appearance of an object depends largely on the object's exterior, boundary representations are common in computer graphics.

3D models are used in a wide variety of fields, and can be displayed using a number of different types of interfaces. Interfaces can provide functionality to enable interaction between a user and the 3D model.

SUMMARY

This disclosure relates to calibration of devices used to generate images of a three-dimensional (3D) object data model.

In a first aspect, a method is provided. The method includes receiving an initial 3D object data model that represents an object. The initial 3D object data model includes a plurality of images aligned relative to one another. The plurality of images are generated using a plurality of devices. The method further includes performing a realignment of the plurality of images. The method further includes generating an updated 3D object data model based on the realignment. The method further includes determining at least one calibration of at least one of the plurality of devices based on a comparison of the initial 3D object data model with the updated 3D object data model. The method further includes providing calibration data to a computing device. The calibration data is indicative of the at least one calibration of the at least one of the plurality of devices. The computing device is operable to use the calibration data to perform the at least one calibration of the at least one of the plurality of devices.

In a second aspect, an article of manufacture is provided. The article of manufacture includes a computer-readable storage medium. The medium has stored thereon program instructions that, upon execution by a computing device, cause the computing device to perform operations. The operations can implement, for example, the method disclosed above.

In a third aspect, a method is provided. The method includes receiving an initial 3D object data model that represents an object. The initial 3D object data model includes a plurality of images aligned relative to one another. The plurality of images are generated using a plurality of devices. The method further includes modifying the initial 3D object data model to generate an updated 3D object data model. The method further includes determining at least one calibration of at least one of the plurality of devices based on a comparison of the initial 3D object data model with the updated 3D object data model. The method further includes providing calibration data to a computing device. The calibration data is indicative of the at least one calibration. The computing device is operable to use the calibration data to perform the at least one calibration.

DETAILED DESCRIPTION

This section discloses embodiments, examples, and implementations with reference to the accompanying figures. The disclosure contemplates various modifications to the disclosed embodiments, examples, and implementations, and contemplates other embodiments, examples, and implementations. Accordingly, this disclosure is not to be limited in scope to the disclosed embodiments, examples, and implementations.

Scanning systems are used for generating three-dimensional (3D) object data models. Such a scanning system can include various types of devices used for scanning an object or, in other words, capturing images of the object. These devices can include, for example, projectors, high-resolution cameras, and lighting devices, among other devices. The captured images, referred to as scans, can be combined and processed to generate a 3D object data model.

In some scanning systems, devices used for capturing images can deviate from a desired state of operation. For example, some devices can undesirably move over time relative to the object to be scanned, resulting in images that can be generated from perspectives that deviate from target perspectives. As another example, a device used to provide lighting can deviate from a target lighting range, in some instances subjecting the object to undesirable lighting conditions. In many instances, such deviations can require that the devices be calibrated relatively frequently, that the acquired images be subjected to additional processing, or both.

Examples provided herein describe techniques for calibrating devices used to generate images of a 3D data model. In some implementations, an initial 3D object data model that represents an object can be received or acquired. The initial 3D object data model can include a plurality of images aligned relative to one another. The plurality of images can be generated using a plurality of devices. The plurality of images can be realigned, and an updated 3D object data model can be generated based on the realignment. The initial and updated 3D object data models can be compared to one another to determine at least one calibration of at least one of the plurality of devices. Calibration data can be provided to a computing device. The computing device can be operable to use the calibration data to perform the at least one calibration.

In some implementations, the initial 3D object data model can be sent from a scanning station to a computing device by way of a wide-area network, such as, for example, a cloud network. In other words, the calibration to be implemented can be determined apart from the scanning station, and can be sent to the scanning station upon determination. In this way, scanning operations can occur at the scanning station while 3D object data can be analyzed and generated using a separate system.

Figure 1A:
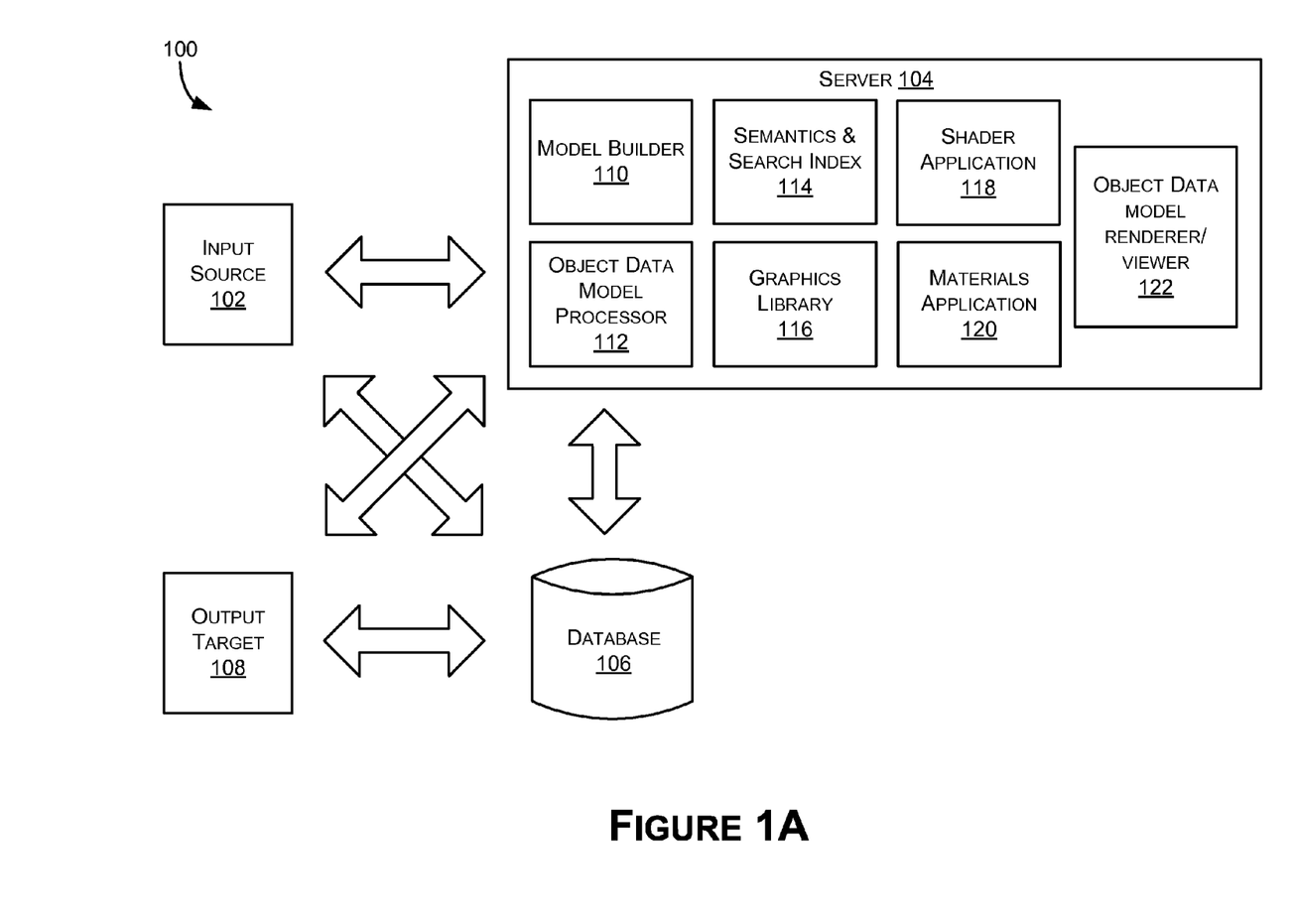
FIGS. 1A and 1B illustrate example systems that can be used for object data modeling, according to some embodiments.

FIG. 1A illustrates a system 100 that can be used for object data modeling, according to an embodiment. The system 100 includes an input source 102, a server 104, a database 106, and an output target 108. The input source 102 can be coupled to the server 104 and the database 106. In addition, the server 104 can be coupled to the database 106 and the output target 108.

Components of the system 100 can be in communication by way of a suitable network (not shown in FIG. 1A). Examples of suitable networks include a local area network (LAN), wide area network (WAN), wireless network (Wi-Fi), and the Internet. In addition, components of the system 100 can be coupled to one another using wired or wireless communication links. Examples of wired communication links include serial and parallel bus. Examples of wireless communication links include Bluetooth and IEEE 802.11 protocols. These examples are illustrative only; the components of the system 100 can coupled to one another in various other ways.

The input source 102 can be any source from which a 3D model can be received. A 3D model can be acquired in various ways. For example, a 3D model can be acquired by working with a vendor or manufacturer to scan an object in 3D. For instance, structure light scanners can capture images of an object, and a shape of the object can be recovered using monochrome stereo cameras and a pattern projector. As another example, a high-resolution digital single-lens reflex (DSLR) camera can be used to capture images for color texture information. As yet another example, a raw-computer-aided drawing (CAD) set of drawings can be received. As still another example, multiple scans of an object can be processed into a merged mesh and assets data model, and provided to the server 104 in that form. Accordingly, the input source 102 can provide a 3D object data model, in various forms, to the server 104.

The server 104 includes a model builder 110, an object data model processor 112, a semantics and search index 114, a graphics library 116, a shader application 118, a materials application 120, and an object data model renderer/viewer 122. The components of the server 104 can be coupled to one another. In addition, any component of the server 104 can be a separate component that is coupled to the server 104. The server 104 can be or include a computing device, such as, for example, the computing device 400 illustrated in FIG. 4. The computing device can have stored instructions that are executable by one or more processors to perform functions of the components of the server 104.

The model builder 110 can receive a mesh data set for a given object from the input source 102. The mesh data set can include a data set defining a dense surface mesh geometry. The model builder 110 can generate an animated model of the object in 3D. For example, the model builder 110 can perform coherent texture unwrapping from the mesh surface, and can determine textures of surfaces emulated from the geometry.

The object data model processor 112 can also receive the mesh data set for the given object from the input source 102, and can generate display meshes. For example, scanned mesh images can be decimated (for example, from 5 million to 120,000 surfaces) utilizing texture-preserving decimation. Texture map generation can also be performed to determine color texture for map rendering. Texture map generation can include using the mesh data sets H that have colors but no UV (coordinate system of a 2D texture space) unwrapping to generate a mesh D with UV unwrapping but no colors. A bidirectional ray can be cast along the triangle's normal to intersect with the mesh H, and color, normal, and displacement can be used for an output. To generate an entire texture image, each pixel in the image can be processed.

In some implementations, the model builder 110 or the object data model processor 112 can output a 3D object data model of an object that includes one file with a combination of all data needed to render a 3D image of the object. In some implementations, the model builder 110 or the object data model processor 112 can output a 3D object data model in the form of multiple files so that the 3D object data model file is divided into smaller parts.

The semantics and search index 114 can receive captured images or processed images that have been decimated and compressed, and can perform texture resampling and shape-based indexing. For example, for each object, the semantics and search index 114 can index or label components of the images (for example, per pixel) as having a certain texture, color, shape, geometry, attribute, or the like. The semantics and search index 114 can receive the 3D object data model file, and can be configured to label portions of the file individually with identifiers related to attributes of the file.

In some implementations, the semantics and search index 114 can be configured to provide annotations for aspects of the 3D object data models. For instance, an annotation can be provided to label or index aspects such as, for example, a color, texture, shape, appearance, description, or function of a 3D object data model. Annotations can be used to label any aspect of an image or 3D object data model, or to provide any type of information. Annotations can be performed manually or automatically, depending on the desired implementation.

The graphics library 116 can include, for example, a WebGL or OpenGL mesh compression to reduce a mesh file size. The graphics library 116 can provide the 3D object data model in a form that is suitable for display on a browser. In some examples, a 3D object data model viewer can be used to display images of the 3D objects data models. The 3D object data model viewer can be implemented using, for example, WebGL or OpenGL within a web browser.

The shader application 118 can be configured to apply a shader to portions of the 3D object data model file or to files of the 3D object data model according to indexes of the file (as labeled by the semantics and search index 114) to generate a 3D image. The shader application 118 can be executed to apply a shader from a number of shaders according to the indexes of the file. The shader can include information related to various aspects of the 3D object data model, such as, for example, texture, color, or appearance.

The shader application 118 can be executed to render an image with shading attributes as defined by indexes of the files. For example, objects with multiple surfaces can have different attributes for each surface, and the shader application 118 can be executed to render each surface accordingly.

The materials application 120 can be configured to apply a material to portions of the 3D object data model file or to files of the 3D object data model based on the indexes of the file (as labeled by the semantics and search index 114) to generate a 3D image. The materials application 120 can be executed to apply a material from a number of materials according to the indexes of the file. The materials application can apply any material, such as leather, metal, wood, etc., so as to render an appearance of a portion of the 3D image.

The materials application 120 can access a database that includes information regarding a number of reference materials (for example, brass, fur, or leather), and objects with multiple materials can be separated into distinct portions so that the materials application 120 can be executed to render the separate distinct portions. As an example, assume that a hood on a car includes a hood ornament, and that the hood is painted and the ornament is made of chrome. The materials application 120 and the shader application 118 can be executed to identify the two separate materials and render each material with an appropriate shade.

The object data model renderer/viewer 122 can receive the 3D object data model file or files and execute the shader application 118 and the materials application 120 to render a 3D image.

The database 106 can store all data sets for a 3D object data model in any number of various forms from raw data captured to processed data for display.

The output target 108 can include a number of different targets, such as, for example, a webpage on the Internet, a search engine, or a database. The output target 108 can include a 3D object data model viewer that enables product advertisements or product searches based on the 3D object data model.

The system 100 can have a configuration that is different from the configuration shown in FIG. 1A. The system 100 can include more or fewer components. Each of the input source 102, the server 104, the database 106, and the output target 108 can include multiple elements. Each of the input source 102, the server 104, the database 106, and the output target 108 can be interconnected.

Figure 1B:
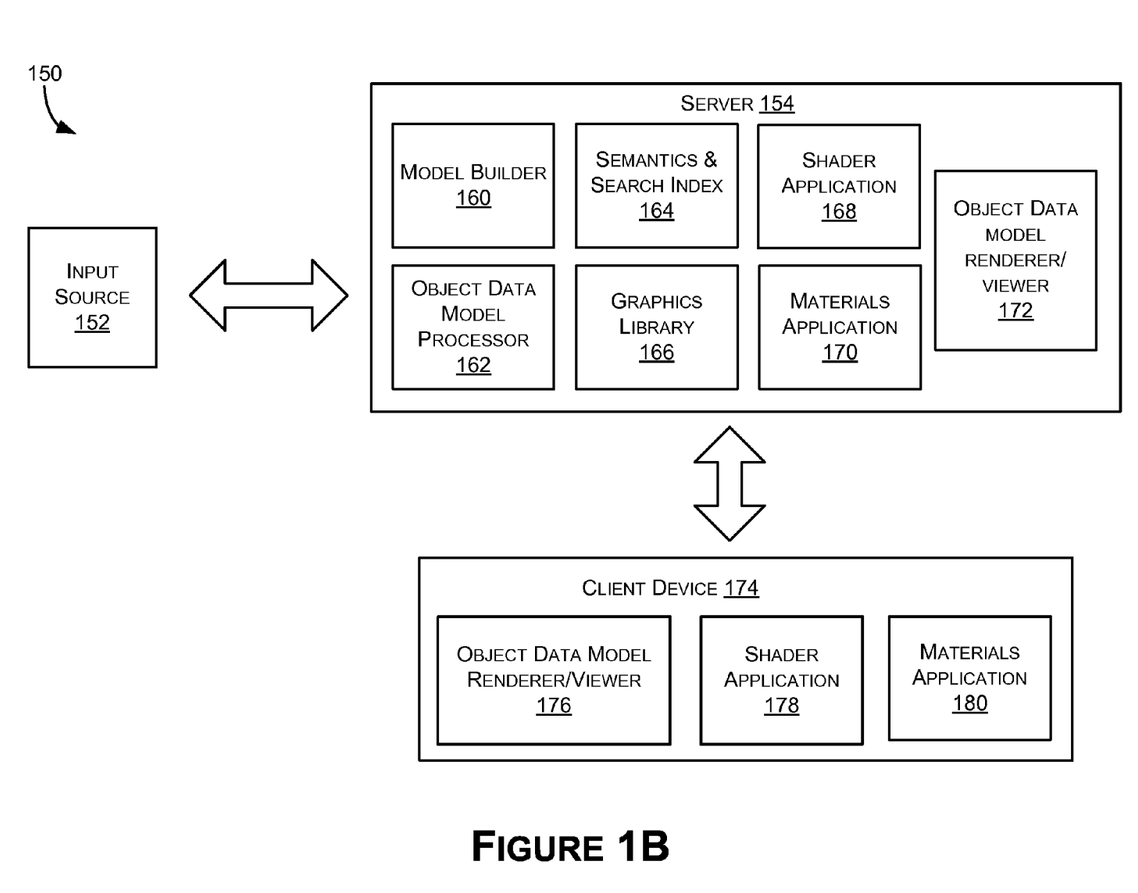

FIG. 1B illustrates another system 150 that can be used for object data modeling, according to an embodiment. The system 150 includes an input source 152 coupled to a server 154, which is coupled to a client device 174. The input source 152 and the server 154 can be similar to, or identical to, the input source 102 and the server 104 discussed above in connection with FIG. 1A. The client device 174 can receive outputs from any of the components of the server 154, and can be configured to render a 3D image.

The client device 174 includes an object data model renderer/viewer 176, a shader application 178, and a materials application 180. The object data model renderer/viewer 176, the shader application 178, and the materials application 180 can be similar to, or identical to, the object data model renderer/viewer 122, the shader application 118, and the materials application 120 of the server 104 discussed above in connection with FIG. 1A.

In some implementations, the client device 174 can receive the 3D object data model file or files from the server 154, and can render a 3D image of the object by executing the shader application 178 and the materials application 180. When executing the shader application 178 and the materials application 180, the client device 174 can access separate databases to retrieve appropriate shader and material information to apply to the image, access the server 154 to receive appropriate shader and material information from the shader application 168 and the materials application 170, or can store information locally regarding the appropriate shader and material information to apply.

In some implementations, the client device 174 can receive the 3D object data model file or files from the server 154 and render a 3D image of the object. In some implementations, the server 154 can render a 3D image of the object and stream the 3D image to the client device 174 for display.

As described, in some implementations, the 3D object data model can include various forms of data, such as raw image data captured, mesh data, or processed data. Data of the 3D object data model can be encoded and compressed to store information related to 3D geometry of an object associated with information related to appearance of the object for transmission and display within a web browser or application on a device.

Data of the 3D object data model can be compressed by initially encoding a triangle mesh representing the 3D object as a list including a plurality of vertices and a plurality of indices. Each vertex in the list can have several arbitrary parameters associated with the vertex, such as, for example, position, surface normal, or texture coordinates. The triangle indices can be stored in a 16-bit unsigned integer format and vertex attributes can be stored in a 32-bit floating point format. The 32-bit floating point format vertex attributes can be reduced to 15-bits. In instances in which compressed data is for a version of a web browser or application that does not have the ability to decompress dictionary encoded data, a delta compression can be used to store differences between the triangle indices and vertex attributes, either in an array of structures layout or a transposed layout. After delta compression, post-delta data can be ZigZag encoded, for example, by using open-source Protocol Buffers library, developed by Google Inc., available at <https://developers.google.com/protocol-buffers/>. Encoding can follow the format ZigZag(x): (x<<1)^(x>>15) with a corresponding decoding (during decompression) to follow the format UnZigZag(x): (x>>1)^(-(x & 1)). ZigZag encoding can be followed by multi-byte character encoding using UTF-8 encoding. The UTF-8 encoded data can be compressed using, for example, GNU Gzip or bzip2 to generate a compressed 3D object data model file.

The compressed copy of the 3D object data model file can be stored in a database, such as, for example, the database 106 illustrated in FIG. 1. The compressed copy of the 3D object data model file can also, or instead, be stored to the server 154, the client device 174, or both. In some implementations, the compressed 3D object data model file can be provided by the server 154 to the client device 174 in response to a request from the client device 174. If a web browser is used to view the 3D object data model file, the client device 174 can decompress the compressed 3D object data model file according to Java instructions, for example, provided in the object browser web page. A local copy of the object browser web page and a local copy of the uncompressed, searchable data of the 3D object data model file can be stored in local memory of the client device 174. The client device 174 can display screenshots of an initial default view of a 3D object, based on the searchable data of the 3D object data model file loaded in the web browser.

In some implementations, the 3D object data file includes information as to geometry of an object sorted by material and divided into portions to be loaded as fragments and reassembled in portions by the client device 174. As an example, for a mobile phone including multiple parts, each part can be rendered using a separate or distinct shader for each material. Accordingly, the 3D object data file can be divided into multiple portions and compressed as described above to retain all of the characteristics of the portions. The client device can receive the compressed 3D object data file, decompress the 3D object data file, and reassemble the portions of the object one-by-one, for example, by loading each fragment of the file, streaming file requests for each shader, and reassembling an image of the object.

Figure 2A:
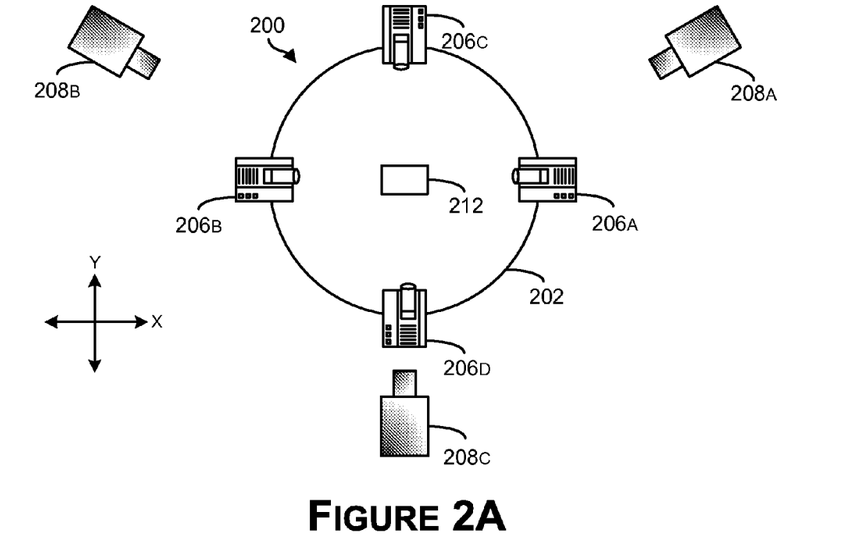
FIGS. 2A and 2B illustrate an example system that can be used for acquiring images.
Figure 2B:
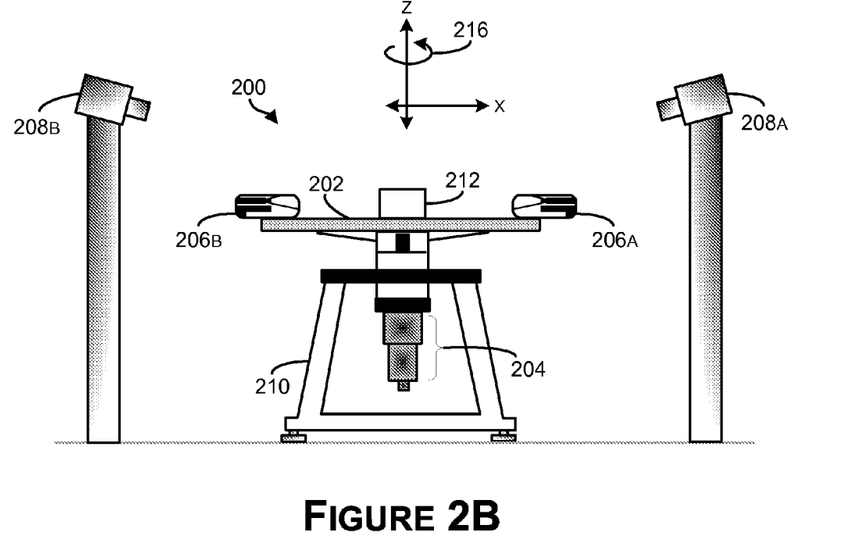

FIG. 2A illustrates a top view of a system 200 that can be used for acquiring images, according to an embodiment. FIG. 2B illustrates a front view of the system 200. The system 200 includes a rotatable platter 202, a drive system 204, projectors 206a-206d, cameras 208a-c, and a support 210. The system 200 can include additional or fewer components.

The rotatable platter 202 can be configured to support objects of varying sizes and weights. In addition, the rotatable platter 202 can be configured to spin about the z-axis. In FIGS. 2A and 2B, the rotatable platter 202 is shown to be circular in shape. In some implementations, the rotatable platter 202 can have a different shape, such as, for example, a rectangular shape.

The drive system 204 can be configured to rotate the rotatable platter 202. To this end, the drive system 204 can include one or more motors, such as, for example, servo motors, that can be configured to rotate the rotatable platter 202 about the z-axis. The drive system 204 can rotate the rotatable platter 204 about the z-axis in the direction 216 shown in FIG. 2A or in the opposite direction.

Figure 4:
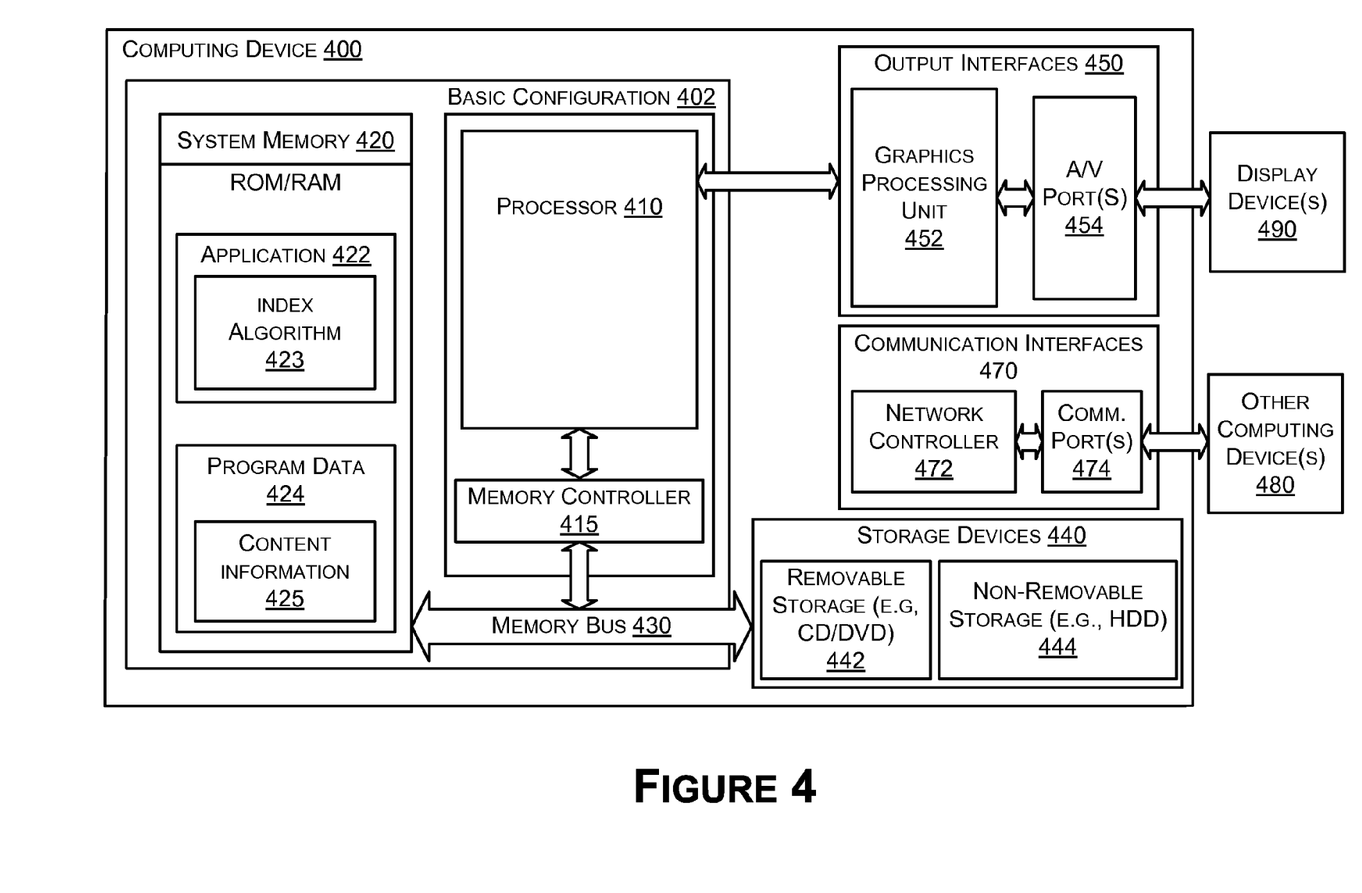
FIG. 4 is a block diagram of an example computing device, according to an embodiment.

The drive system 204 can be coupled to a computing device (not shown in FIG. 2A or 2B), such as, for example, the computing device 400 illustrated in FIG. 4. The computing device can be configured to provide instructions and/or signals to the drive system 204 for rotating the rotatable platter 202 in a desired manner. The computing device, by way of the drive system 204, can cause the rotatable platter 202 to rotate in a continuous manner or in an incremental manner. In other words, when controlled in the continuous manner, the rotatable platter 202 can be rotated about the axis 214 to a desired angular position without being stopped. When controlled in the incremental manner, the rotatable platter 202 can be rotated to a discrete number of angular positions and can be stopped at each of these positions.

In some implementations, the drive system 204 can be combined with the rotatable platter 202. In these implementations, a computing device can be coupled to the drive system 204 and, in essence, to the rotatable platter 202 itself. In some implementations, the rotatable platter 202 can be rotated manually. In these implementations, the system 200 can, but need not, include a drive system 204.

The projectors 206a-206d can be coupled to the rotatable platter 202. Accordingly, in the illustrated system 200, when the rotatable platter 202 rotates about the z-axis, the projectors 206a-206d rotate about the z-axis as well. FIGS. 2A and 2B show four projectors for illustration only. Additional or fewer projectors can be used. As mentioned above, the projectors 206a-206d can be fixed from a perspective of the object 212 as the rotatable platter 202 rotates. As an example, the rotatable platter 202 can be rotated to eight discrete angles (for example, 45°, 90°, 135°, 180°, 225°, 270°, 315°, and 360°) from a starting point. Accordingly, the projectors 206a-206d that are coupled to the surface 202, along with the object 212 that is placed on the surface 202, rotate with the surface 202.

When the rotating surface 202 is at a given angle of rotation, one or more of the projectors 206a-206d can project a pattern on the object 212. As an example, the projector 206a, for instance, can include a respective light source. In this example, a computing device can be configured to control the light source to project a light pattern on the object 212. The light pattern can be a relatively simple light pattern, such as, for example, a pattern of dots tracing a curve. The light pattern can instead be a relatively complex light pattern, such as, for example, a pattern of a flower. In addition, the computing device can be configured to activate the projectors 206a-206d so that the projectors 206-206d can project a given pattern on the object 212. Similarly, the computing device can be configured to deactivate the projectors 206-206d so that the given pattern can be removed from the object 212. In addition, multiple patterns can be projected on the object 212. As an example, patterns can be projected on all or substantially all portions (for example, sides or edges) of the object 212, and the patterns can include multiple colors.

While a pattern is being projected on the object 212, one or more of the cameras 208a-208c can be configured to capture images of the object 212. In this way, the cameras 208a-208c can be used to capture a set of images that depicts the projected pattern superimposed on the object 212. In addition, the cameras 208a-208c can be configured relative to the projectors 206a-206d. For example, if the projectors 206a-206d are configured to project infrared light patterns on the object 212, then the cameras 208a-208c can be infrared cameras that are configured to capture infrared electromagnetic radiation.

Although the projectors 206a-206d are discussed above in connection with light sources, the projectors 206a-206d can project electromagnetic radiation of any suitable wavelength. In some implementations, the projectors 206a-206d can project electromagnetic radiation that includes one or more wavelengths that are generally visible to humans. For example, the projectors 206a-206d can be configured to project laser beams of different colors. In some implementations, the projectors 206a-206d can project electromagnetic radiation that includes one or more wavelengths that are generally invisible to humans. For example, the projectors 206a-206d can be configured to project infrared light.

The cameras 208a-208c are disposed about the rotatable platter 202. The cameras 208a-208c can be any suitable types of cameras. For example, the cameras 208a-208c can be monochrome stereo cameras, machine vision cameras, high-resolution digital single-lens reflex (DSLR) cameras, or a combination of these types. The cameras 208a-208c can be configured to acquire images of the object 212 that is placed on the rotatable platter 202.

When the rotating surface 202 is at a given angle of rotation, one or more of the cameras 208a-208c can capture an image or multiple images of the object 212. In addition, at the given angle of rotation, one or more of the cameras 208a-208c can be moved across multiple positions, and can capture multiple images of the object 212 at the multiple respective positions. For example, at the given angle of rotation, a computing device can move the camera 208a, for example, from a first elevation to a second elevation, and the camera 208a can capture images at the respective elevations.

In some implementations, one or more of the cameras 208a-208c can be configured to capture images of the object from a height that is below the height of the rotatable platter 202. For example, the rotatable platter 202 can be made of a transparent material, and the camera 208a, for example, can be disposed below the rotatable platter 202. Accordingly, in this example, the camera 208a can capture images of the object 212 through the transparent rotatable platter 202 and from below the rotatable platter 202.

In some implementations, the cameras 208a-208c can having different imaging parameters from one another. For example, one of the cameras 208a-208c can be configured to capture relatively high-resolution images of the object 212, whereas another of the cameras 208a-208c can be configured to capture relatively low-resolution images of the object 212. This example is illustratively only; various other imaging parameters can be different among the cameras 208a-208c. Examples of imaging parameters include aperture and focal depth.

Although the system 200 is shown to include cameras 208a-208c, any suitable image-capture devices can be used in place of, or in addition to the cameras 208a-208c. In addition, although FIGS. 2A and 2B show three cameras, additional or fewer cameras can be used. In addition, while the cameras 208a-208c are shown to be stationary, other arrangements are possible. For example, in some implementations, the cameras 208a-208c can be rotatable, and the projectors 206a-206d can be stationary.

In the system 200, the support 210 is shown to support the drive system 204 and the projectors 206a-206d. The configuration of the support 210 is illustrative only. Other configurations of the support 210 are possible.

The object 212 can be any suitable object. Examples of suitable objects include a bag, shoe, and phone. Of course, these examples are illustrative only. Various other objects can be used. In addition, in some implementations, the object 212 can include multiple objects, such as, for example, a pair of shoes.

In the system 200, the number of angles of rotation can vary depending on, for example, the complexity of the object 212. As an example, for a symmetric object, images may only need to be captured from a relatively small number of angles for generation of a 3D object data model, whereas for an asymmetric, images may need to be captured from a relative large number of angles for 3D object data model generation.

The system 200 can include devices for varying light conditions of the object 212. For example, the projectors 206a-206c can be controlled to provide a first lighting condition of the object 212, for example, by providing light to the object 212 at a first intensity and at a first angle. In addition, the projectors 206a-206c can be controlled to alter the lighting condition of the object 212, for example, by switching from the first lighting condition to a second lighting condition, in which one or more of the projectors 206a-206c provide light to the object 212 at a second intensity and at a second angle. Devices other than the projectors 206a-206c can be used to provide and/or change the lighting conditions of the object 212. These devices can be part of the system 200, coupled to the system 200, or outside and uncoupled to the system 200.

In some implementations, upon capturing images of the object 212 from multiple angles of rotation, a computing device can be configured to generate a 3D object data model using the images. As an example, assume that the cameras 208a-208c capture a first set of images of the object 212 while the object 212 is being rotated about the axis 214. Also assume that the cameras 208a-208c capture a second set of images of the object 212, while the object 212 is in rotation and while the scanners 206a-206d are projecting a pattern onto the object 212.

To generate a 3D object data model, the computing device can determine a proper alignment of images in the second set relative to one another. To this end, the computing device can compare portions of the projected pattern in a given image in the second set with portions of the projected pattern in other images in the second set. Based on the comparisons, the computing device can determine which images are spatially neighboring images, and can determine how to align spatially neighboring images relative to one another.

The computing device can use any suitable image processing operation or technique can be used to generate the 3D object data model. For example, an iterative closest point (ICP) technique can be used. Examples of processing tools that can implement ICP are MeshLab, CloudCompare, and Point Cloud Library.

In the system 200, various devices can be calibrated by a computing device, and in some implementations, the devices can be manually calibrated. For example, the rotatable platter 202, the drive system 204, the projectors 206a-206d, and the cameras 208a-208c can be coupled to a computing device, either directly or by way of respective drive systems. The computing device can be any suitable computing device, such as, for example, the computing device 400 illustrated in FIG. 4.

In some implementations, the computing device can be configured to adjust positions of the various devices relative to the object 212. For instance, the computing device can be configured to move the projector 206b, for example, along the x-axis, y-axis, or z-axis, or along a direction that includes non-zero components along two or more of the x-axis, y-axis, and z-axis. Of course, the computing device can be configured to similarly move the other projectors 206a, 206c, and 206d, as well as the rotatable platter 202, the drive system 204, the cameras 208a-208c, and the support 210. In addition, the computing device can be configured to rotate devices of the system 200 relative to the object 212. As an example, the computing device can be configured to rotate the camera 208a, for example, relative to the object 212.

Figure 3:
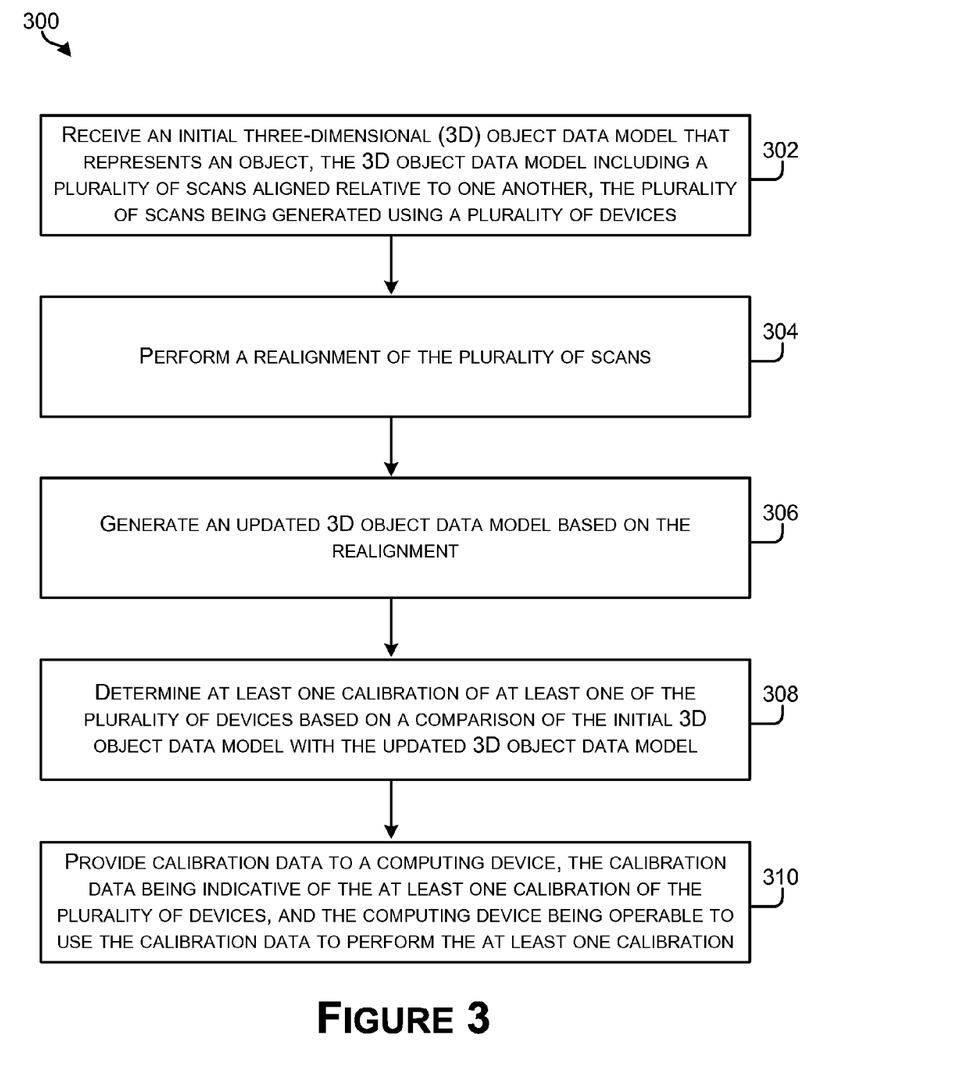
FIG. 3 is a block diagram of an example method, according to an embodiment.

FIG. 3 is a block diagram of a method 300, according to an embodiment. The method 300 can be used to calibrate devices that are used to generate images of a three-dimensional (3D) object data model.

The method 300 can be implemented in connection with various types of systems and computing devices. As an example, the method 300 can be implemented using a system, such as, for example, the systems 100, 150 discussed above in connection with FIGS. 1A and 1B or the system 200 discussed above in connection with FIGS. 2A and 2B. As another example, the method 300 can be implemented using a computing device, such as, for example, the computing device 400 discussed below in connection with FIG. 4. As yet another example, the method 300 can be implemented in the form of a computer program product, such as, for example, the computer program product 500 discussed below in connection with FIG. 5.

The method 300 can include one or more operations, functions, or actions, as illustrated by blocks 302-310. Although FIG. 3 shows the blocks 302-310 in a sequential order, these blocks can be performed in parallel or in a different order. Also, the blocks 302-310 can be combined into fewer blocks, divided into additional blocks, or removed, depending on the desired implementation.

In addition, each of the blocks 302-310 can represent a module, a segment, or a portion of program code, which includes one or more instructions executable by a processor or computing device for implementing specific logical functions or steps in the method 300. The program code can be stored on any type of computer-readable medium. The computer-readable medium can include a non-transitory computer readable medium, such as a computer-readable medium that stores data for short periods of time, like register memory, processor cache, and random access memory (RAM). The computer-readable medium can also include non-transitory media, such as secondary or persistent long term storage, like read only memory (ROM), optical or magnetic disks, and compact-disc read only memory (CD-ROM). The computer-readable media can be any other volatile or non-volatile storage system. The computer-readable medium can be considered a computer-readable storage medium or a tangible storage device. In addition, each of the blocks 302-310 can represent circuitry that is wired to perform the specific logical functions of the method 300.

At block 302, the method 300 includes receiving an initial three-dimensional (3D) object data model. In the method 300, the initial 3D object data model represents an object. The initial 3D object data model can represent any suitable type of object. For example, the object can be a mobile phone, a shoe, or a book. In some implementations, the initial 3D object data model represents multiple objects. For example, the initial 3D object data model can represent multiple mobile phones, a pair of shoes, or a stack of books. In the method 300, the initial 3D object data model includes a plurality of images aligned relative to one another. For example, the initial 3D object data model can be generated by capturing and aligning images using one or more of the techniques discussed above. In the method 300, the plurality of images are generated using a plurality of devices. In some implementations, the plurality of devices include at least one of a camera, a device that is configured to support the object, and a light source. For example, with reference to FIGS. 2A and 2B, the plurality of images can be generated using devices of the system 200, including the rotatable platter 202, the drive system 204, the projectors 206a-206d, the cameras 208a-208c, and the support 210. Of course, block 302 of the method 300 can be carried out using different devices of the system 200 or using a different system.

At block 304, the method 300 includes performing a realignment of the plurality of images. In some implementations, performing the realignment of the plurality of images includes applying an image processing operation to the initial 3D object data model and the updated 3D object data model. Any suitable image processing operation or technique can be used to perform the realignment of the images. For example, an iterative closest point (ICP) technique can be used. ICP is an algorithm that can be used to reconstruct 2D or 3D surfaces from different scans. ICP can iteratively revise a transformation (such as, for example, a translation or rotation) needed to minimize the distance between points of two scans. As an input, ICP can receive points from two scans and an initial estimation of the transformation. Using at least these inputs, ICP can generate a refined transformation. The operations of ICP generally include (1) associating points by using the nearest neighbor search (also known as "proximity search," "similarity search," or "closest point search"), (2) estimating transformation parameters using a mean square cost function (also known as "mean squared error"), and (3) transforming the points using the estimated parameters. Operations (1) to (3) can then be iterated. In operation (1), the nearest neighbor search can be a technique for finding one or more closest points in metric space. Any suitable nearest neighbor search technique can be used. Examples of processing tools that can implement ICP are MeshLab, CloudCompare, and Point Cloud Library.

In some implementations, the method 300 includes receiving a realigned plurality of images. For example, a computing device, such as, for example, a client device, can perform a realignment of the plurality of images and send the realigned plurality of images to another computing device, such as, for example, a server device. In this way, the server device can receive the realigned plurality of images without the server device performing the realignment. Although this example is discussed with reference to a client device and a server device, any two or more computing devices can be used. For instance, this example can be carried out in connection with two computing devices that do not have a server/client relationship. Other examples are possible.

Although block 304 is discussed above in connection with performing a realignment of the plurality of images, more generally, the initial 3D object data model itself can be modified to generate the updated 3D object data model. For example, the modification can include a modification of a position, a brightness, a color calibration, or an exposure level of the initial 3D object data model. Of course, the modification can include any combination of these modifications.

At block 306, the method 300 includes generating an updated 3D object data model based on the realignment. In some implementations, generating the updated 3D object data model can include deriving the updated 3D object data model from the initial 3D object data model. In some implementations, generating the updated 3D object data model can include generating the updated 3D object data model using the plurality of images and data from the realignment, without using the initial 3D object data model.

At block 308, the method 300 includes determining at least one calibration of at least one of the plurality of devices based on a comparison of the initial 3D object data model with the updated 3D object data model. In some implementations, comparing the initial 3D object data model with the updated 3D object data model includes comparing raw scan data (i.e., the plurality of images) with mesh aligned data (i.e., data from the updated 3D object data model). The comparison can be used to determine, for each of the vertices of the updated 3D object data model, which device (for example, a camera) was used to capture a given scan image. In addition, the comparison can be used to determine a difference, for each of the vertices of the updated 3D object data model, between the raw scan data and the mesh aligned data. Accordingly, a calibration for a given device (or for a set of devices) can be determined. As an example, the calibration can indicate that a device is to be moved a given distance in a given direction (i.e., along an x-, y-, or z-axis) relative to the object to be scanned. As another example, the calibration can indicate that the device is to be rotated relative to the object to be scanned. As yet another example, the calibration can indicate that a lighting condition provided by the device is to be adjusted. These examples are illustrative only; other examples are possible.

At block 310, the method 300 includes providing calibration data to a computing device. In some implementations, providing the calibration data to the computing device includes providing the calibration data to the computing device by way of a wide-area network, such as, for example, a type of network commonly referred to as a cloud network. Accordingly, 3D object data models can be analyzed and adjusted in the cloud network, and calibration data can be determined in the cloud network. For example, a first computing device of a scanning station can be used to capture images and send the images (or send a 3D object data model using the images) to a second computing device that is part of a cloud network. The second computing device can analyze the images or the 3D object data model, and can determination one or more calibrations in connection with the scanning station. The second computing device can then send the one or more calibrations to the first computing device. In this way, much or all of the calibration-related processing can be done using a cloud network without requiring the limited resources of the scanning station. Of course, the calibration data can be provided to the computing devices using any other type of network. For example, in some implementations, calibration data can be provided to the computing device by way of wired connections.

In the method 300, the calibration data is indicative of the at least one calibration. In some implementations, the calibration data is indicative of an amount by which to move at least one of the plurality of devices relative to the object. In some implementations, the calibration data is indicative of an amount by which to adjust a lighting condition of the object. Other examples are possible.

In the method 300, the computing device is operable to use the calibration data to perform the at least one calibration. In some implementations, the method 300 further includes using the computing device to perform the at least one calibration. In some of these implementations, the computing device performing the at least one calibration includes moving the at least one of the plurality of devices relative to the object. In some implementations, the computing device can control the plurality of devices based on the calibration data, without the need for user intervention. As an example, a computing device can be coupled to a plurality of devices by way of suitable drive systems and/or mechanical linkages. In this example, upon receiving calibration data, the computing device can automatically calibrate one or more of the devices. For instance, assume that the calibration data indicates that a camera is to be moved by 1 cm along a positive direction of an x-axis. Upon receiving the calibration data, the computing device can provide instructions to, for example, a drive system, which, in turn, can cause the camera to move by 1 cm along the positive direction of the x-axis. Of course, other examples are possible. In some implementations, the computing device can display information that is indicative of the calibration data. In this way, the computing device can convey to a user that one or more devices are to be calibrated as provided by the calibration data. In some implementations, the computing device can display an indicator requesting the user to authorize the computing device to perform the calibration. In these implementations, upon receiving authorization, the computing device can proceed to perform the calibration in the way discussed above or in another way.

The method 300 can involve the use of multiple scans of a given object to determine a calibration trend, for example, at a given scan station. In some implementations, the method 300 includes comparing the updated 3D object data model with a plurality of 3D object data models representing the object. The plurality of 3D object data models are generated at different times using the plurality of devices. In these implementations, the method 300 further includes determining a calibration trend based on comparing the updated 3D object data model with the plurality of 3D object data models. In these implementations, the method 300 further includes updating the calibration data based on the calibration trend. For example, the plurality of 3D object data models can be generated at spaced intervals throughout a day. The updated 3D object data model can be compared with the plurality of 3D object data models to determine how one or more devices are deviating from a desired position, lighting condition, or the like, as the day progresses. Based on the determination, a calibration trend can be determined. For example, the calibration trend can indicate that a given camera, for example, has shifted in a direction along an x-axis throughout the day. Accordingly, the calibration trend can extrapolate that the camera is likely to move further, and can indicate that some future 3D object data models are to be analyzed to account for the extrapolated move of the camera.

The method 300 can involve the use of image metadata to determine the calibration. In some implementations, the method 300 further includes analyzing the plurality of images to identify metadata. The metadata identifies at least one of the plurality of devices. In these implementations, the method 300 further includes determining the at least one calibration based on the metadata.

In some of the implementations and examples discussed below, the initial 3D object data model may be referred to as a first initial 3D object data model, the updated 3D object data model may be referred to as a first updated 3D object data model, the object may be referred to as a first object, the plurality of images may be referred to as a first plurality of images, and the plurality of devices may be referred to as a first plurality of devices.

In some implementations, the method 300 further includes receiving a second 3D object data model that represents the object. The second 3D object data model includes a second plurality of images aligned relative to one another. The second plurality of images are generated using the plurality of devices. In these implementations, the method 300 further includes comparing the second 3D object data model with the first updated 3D object data model. In these implementations, the method 300 further includes generating an update of the at least one calibration based on comparing the first updated and the second 3D object data models. In these implementations, the method 300 further includes providing second calibration data to the computing device. The second calibration data is indicative of the update.

The method 300 can involve comparing a 3D object data model that represents one object with a 3D object data model that represents another object. In some implementations, the method 300 further includes receiving a second 3D object data model that represents a second object that is different from the first object. The second 3D object data model includes a second plurality of images aligned relative to one another. The second plurality of images are generated using the plurality of devices. In these implementations, the method 300 further includes comparing the second 3D object data model with the first updated 3D object data model. In these implementations, the method 300 further includes generating an update of the at least one calibration based on comparing the first updated and the second 3D object data models. In these implementations, the method 300 further includes providing second calibration data to the computing device. The second calibration data is indicative of the update.

The method 300 can involve comparing a set of images generated one plurality of devices (for example, in a first scan station) with a set of images generated by another plurality of devices (for example, in a second scan station). Doing so can identify a distortion that is common to both pluralities of devices and, in essence, to both scan stations. In some implementations, the method 300 further includes receiving a second 3D object data model. The second 3D object data model includes a second plurality of images generated using a second plurality of devices. The second plurality of devices is different from the first plurality of devices. In these implementations, the method 300 includes analyzing the first plurality of images and the second plurality of images to identify a distortion that is common to both the first plurality of devices and the second plurality of devices. In these implementations, the method 300 further includes generating an update of the at least one calibration based on the distortion. In these implementations, the method 300 further includes providing second calibration data to the computing device. The second calibration data is indicative of the update.

FIG. 4 illustrates a functional block diagram of a computing device 400, according to some embodiments. The computing device 400 can be used to perform disclosed operations, such as, for example, acquiring images, generating three-dimensional (3D) object data models, generating a calibration of one or more devices used to generate images of a 3D object data model, and calibrating the devices, as discussed above in connection with FIGS. 1A-1B, 2, and 3. Of course, the computing device 400 can be used to perform more than one of these operations, portions of these operations, or other operations.

The computing device 400 can be or include various types of devices, such as, for example, a personal computer, mobile device, cellular phone, touch-sensitive wristwatch, tablet computer, video game system, or global positioning system. In a basic configuration 402, the computing device 400 can include one or more processors 410 and system memory 420. A memory bus 430 can be used for communicating between the processor 410 and the system memory 420. Depending on the desired configuration, the processor 410 can be of any type, including a microprocessor (µP), a microcontroller (µC), or a digital signal processor (DSP), among others. A memory controller 415 can also be used with the processor 410, or in some implementations, the memory controller 415 can be an internal part of the processor 410.

Depending on the desired configuration, the system memory 420 can be of any type, including volatile memory (such as RAM) and non-volatile memory (such as ROM, flash memory). The system memory 420 can include one or more applications 422 and program data 424. The application(s) 422 can include an index algorithm 423 that is arranged to provide inputs to the electronic circuits. The program data 424 can include content information 425 that can be directed to any number of types of data. The application 422 can be arranged to operate with the program data 424 on an operating system.

The computing device 400 can have additional features or functionality, and additional interfaces to facilitate communication between the basic configuration 402 and any devices and interfaces. For example, data storage devices 440 can be provided including removable storage devices 442, non-removable storage devices 444, or both. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives. Computer storage media can include volatile and nonvolatile, non-transitory, removable and non-removable media implemented in any method or technology for storage of information, such as computer readable instructions, data structures, program modules, or other data.

The system memory 420 and the storage devices 440 are examples of computer storage media. Computer storage media includes, but is not limited to, RAM, ROM, EEPROM, flash memory or other memory technology, CD-ROM, DVDs or other optical storage, magnetic cassettes, magnetic tape, magnetic disk storage or other magnetic storage devices, or any other medium that can be used to store the desired information and that can be accessed by the computing device 400.

The computing device 400 can also include output interfaces 450 that can include a graphics processing unit 452, which can be configured to communicate with various external devices, such as display devices 490 or speakers by way of one or more A/V ports or a communication interface 470. The communication interface 470 can include a network controller 472, which can be arranged to facilitate communication with one or more other computing devices 480 over a network communication by way of one or more communication ports 474. The communication connection is one example of a communication media. Communication media can be embodied by computer-readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR), and other wireless media.

The computing device 400 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 400 can also be implemented as a personal computer including both laptop computer and non-laptop computer configurations.

Figure 5:
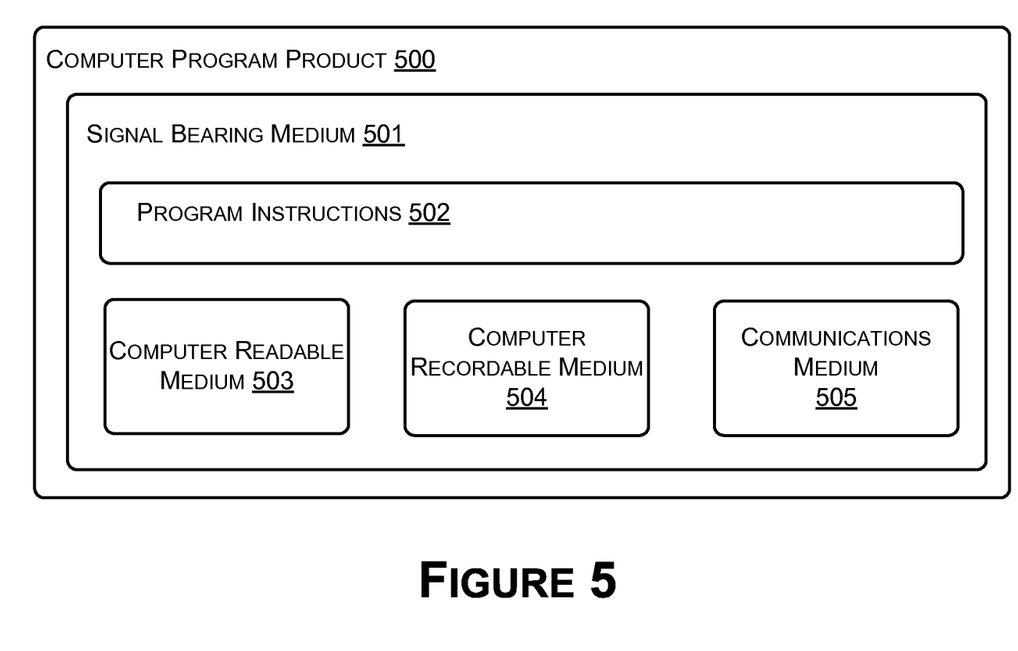
FIG. 5 is diagram of an example computer program product, according to an embodiment.

The disclosed methods can be implemented as computer program instructions encoded on a non-transitory computer-readable storage medium in a machine-readable format, or on other non-transitory media or articles of manufacture. FIG. 5 illustrates a conceptual partial view of an exemplary computer program product 500 that includes a computer program for executing a computer process on a computing device, arranged according to some disclosed implementations.

The computer program product 500 is provided using a signal bearing medium 501. The signal bearing medium 501 can include one or more programming instructions 502 that, when executed by one or more processors, can provide functionality or portions of the functionality discussed above in connection with FIGS. 1A-1B, 2, and 3. In some implementations, the signal bearing medium 501 can encompass a computer-readable medium 503 such as, but not limited to, a hard disk drive, a CD, a DVD, a digital tape, or memory. In some implementations, the signal bearing medium 501 can encompass a computer-recordable medium 504 such as, but not limited to, memory, read/write (R/W) CDs, or R/W DVDs. In some implementations, the signal bearing medium 501 can encompass a communications medium 505 such as, but not limited to, a digital or analog communication medium (for example, a fiber optic cable, a waveguide, a wired communications link, or a wireless communication link). Thus, for example, the signal bearing medium 501 can be conveyed by a wireless form of the communications medium 505 (for example, a wireless communications medium conforming with the IEEE 802.11 standard or other transmission protocol).

The one or more programming instructions 502 can be, for example, computer executable instructions. A computing device (such as the computing device 400 of FIG. 4) can be configured to provide various operations in response to the programming instructions 502 conveyed to the computing device by one or more of the computer-readable medium 503, the computer recordable medium 504, and the communications medium 505.

While various examples have been disclosed, other examples will be apparent to those skilled in the art. The disclosed examples are for purposes of illustration and are not intended to be limiting, with the true scope and spirit being indicated by the following claims.

What is claimed is:

1. A method comprising:
receiving a first three-dimensional (3D) object data model that represents a first object, wherein the first 3D object data model includes a first plurality of images aligned relative to one another, wherein the first plurality of images are generated using a plurality of devices;
receiving a second three-dimensional (3D) object data model that represents a second object that is different from the first object, wherein the second 3D object data model includes a second plurality of images aligned relative to one another, wherein the second plurality of images are generated using the plurality of devices;
performing a realignment of the first plurality of images;
generating a first updated 3D object data model based on the realignment;
determining at least one calibration of at least one of the plurality of devices based on a comparison of the first 3D object data model with the first updated 3D object data model;
providing calibration data to a computing device, wherein the calibration data is indicative of the at least one calibration of the at least one of the plurality of devices, and wherein the computing device is operable to use the calibration data to perform the at least one calibration of the at least one of the plurality of devices;
comparing the second 3D object data model with the first updated 3D object data model;
generating an update of the at least one calibration of the at least one of the plurality of devices based on comparing the first updated and the second 3D object data models; and
providing second calibration data to the computing device, wherein the second calibration data is indicative of the update.

2. The method of claim 1, further comprising:
comparing the first updated 3D object data model with a plurality of 3D object data models representing the first object, wherein the plurality of 3D object data models are generated at different times using the plurality of devices;
determining a calibration trend based on comparing the first updated 3D object data model with the plurality of 3D object data models; and
updating the calibration data based on the calibration trend.

3. The method of claim 1, wherein the calibration data is indicative of an amount by which to move at least one of the plurality of devices relative to the first object.

4. The method of claim 1, wherein the calibration data is indicative of an amount by which to adjust a lighting condition of the first object.

5. The method of claim 1, wherein performing the realignment of the first plurality of images is based on an application of an iterative closest point technique to the first 3D object data model.

6. The method of claim 1, further comprising:
analyzing one or more of the first plurality of images to identify metadata, wherein the metadata identifies one or more of the plurality of devices used to generate the one or more of the first plurality of images; and
determining the at least one calibration based on the metadata.

7. The method of claim 1, wherein the plurality of devices include at least one of a camera, a device that is configured to support the first object, and a light source.

8. The method of claim 1, wherein providing the calibration data to the computing device comprises providing the calibration data to the computing device by way of a wide-area network.

9. The method of claim 1, further comprising using the computing device to perform the at least one calibration of the at least one of the plurality of devices.

10. The method of claim 9, wherein using the computing device to perform the at least one calibration comprises causing a movement of the at least one of the plurality of devices relative to the object.

11. The method of claim 1, wherein the method further comprises:
receiving a third 3D object data model that represents the first object, wherein the third 3D object data model includes a third plurality of images aligned relative to one another, wherein the third plurality of images are generated using the plurality of devices;
comparing the third 3D object data model with the first updated 3D object data model;
generating an update of the at least one calibration of the at least one of the plurality of devices based on comparing the first updated and the third 3D object data models; and
providing third calibration data to the computing device, wherein the third calibration data is indicative of the update.

12. The method of claim 1, wherein the plurality of devices is a first plurality of devices,
wherein the second plurality of images generated using a second plurality of devices, and wherein the second plurality of devices is different from the first plurality of devices,
and wherein the method further comprises:
analyzing the first plurality of images and the second plurality of images to identify a distortion that is common to at least one device of both the first plurality of devices and the second plurality of devices;
generating an update of the at least one calibration of the at least one of the first plurality of devices based on the distortion.

13. An article of manufacture including a non-transitory computer-readable storage medium, having stored thereon program instructions that, upon execution by a computing device, cause the computing device to perform operations comprising:
receiving a first three-dimensional (3D) object data model that represents a first object, wherein the first 3D object data model includes a first plurality of images aligned relative to one another, wherein the first plurality of images are generated using a plurality of devices;
receiving a second three-dimensional (3D) object data model that represents a second object that is different from the first object, wherein the second 3D object data model includes a second plurality of images aligned relative to one another, wherein the second plurality of images are generated using the plurality of devices;
performing a realignment of the first plurality of images;
generating a first updated 3D object data model based on the realignment;
determining at least one calibration of at least one of the plurality of devices based on a comparison of the first 3D object data model with the first updated 3D object data model; and
providing calibration data to a second computing device, wherein the calibration data is indicative of the at least one calibration, and wherein the second computing device is operable to use the calibration data to perform the at least one calibration;
comparing the second 3D object data model with the first updated 3D object data model;
generating an update of the at least one calibration of the at least one of the plurality of devices based on comparing the first updated and the second 3D object data models; and
providing second calibration data to the second computing device, wherein the second calibration data is indicative of the update.

14. The article of manufacture of claim 13, wherein the calibration data is indicative of an amount by which to move at least one of the plurality of devices relative to the object.

15. The article of manufacture of claim 13, wherein the calibration data is indicative of an amount by which to adjust a lighting condition of the object.

16. The article of manufacture of claim 13, wherein the plurality of devices include at least one of a camera, a device that is configured to support the object, and a light source.

17. A method comprising:
receiving a first three-dimensional (3D) object data model that represents a first object, wherein the first 3D object data model includes a first plurality of images aligned relative to one another, wherein the first plurality of images are generated using a plurality of devices;
receiving a second 3D object data model that represents a second object that is different from the first object, wherein the second 3D object data model includes a second plurality of images aligned relative to one another, and wherein the second plurality of images are generated using the plurality of devices;
modifying the first 3D object data model to generate an updated 3D object data model;
determining at least one calibration of at least one of the plurality of devices based on a comparison of the second 3D object data model with the updated 3D object data model; and
providing calibration data to a computing device, wherein the calibration data is indicative of the at least one calibration, and wherein the computing device is operable to use the calibration data to perform the at least one calibration.

18. The method of claim 17, wherein modifying the first 3D object data model to generate the updated 3D object data model comprises modifying at least one of a position, a brightness, a color calibration, and an exposure level of the first 3D object data model.

19. The method of claim 17, further comprising:
comparing the updated 3D object data model with a plurality of 3D object data models representing the object, wherein the plurality of 3D object data models are generated at different times using the plurality of devices;
determining a calibration trend based on comparing the updated 3D object data model with the plurality of 3D object data models, wherein the calibration trend is indicative of an amount by which to move at least one of the plurality of devices relative to the object; and
updating the calibration data based on the calibration trend.

* * * * *